US007584114B2

(12) United States Patent  
Estrada et al.

(10) Patent No.: US 7,584,114 B2
(45) Date of Patent: Sep. 1, 2009

(54) SYSTEM AND METHOD FOR INTEGRATING PROJECTS EVENTS WITH PERSONAL CALENDAR AND SCHEDULING CLIENTS

(75) Inventors: Antonio Estrada, Nashua, NH (US); Charles R. Hill, Belmont, MA (US); Sami M. Shalabi, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 1117 days.

(21) Appl. No.: 10/349,427

(22) Filed: Jan. 22, 2003

(65) Prior Publication Data

US 2004/0143472 A1 Jul. 22, 2004

(51) Int. Cl.
*G06F 7/60* (2006.01)
*G06Q 99/00* (2006.01)
(52) U.S. Cl. .................. 705/9; 707/104.1; 709/204
(58) Field of Classification Search .................. 705/9
See application file for complete search history.

(56) References Cited

U.S. PATENT DOCUMENTS

| 6,369,840 | B1 | 4/2002 | Barnett et al. ............... 345/853 |
| 6,380,959 | B1 | 4/2002 | Wang et al. ................. 345/853 |
| 6,920,328 | B2 * | 7/2005 | Wollrab .................... 455/456.1 |
| 7,114,126 | B2 * | 9/2006 | Berger et al. ................ 715/750 |
| 7,133,900 | B1 * | 11/2006 | Szeto ......................... 709/206 |
| 2002/0154178 | A1 * | 10/2002 | Barnett et al. ............... 345/853 |

OTHER PUBLICATIONS

Prakash, Data Management Issues and Trade-Offs in CSCW Systems, IEEE Transactions on Knowledge and Data Engineering, vol. 11, No. 11, Jan./Feb. 1999.*

Gillmor and Angus, Teamware Comes Of Age—Vendors Are Turning To Browser Technology To Integrate More Users, InformationWeek, Sep. 20, 1999.*

Hornett and Rocket, Lotus's online meeting software can make your next project a great success, but you may have to learn new work habits to collaborate online, Rock Team, Nov./Dec. 1999.*

(Continued)

*Primary Examiner*—Andre Boyce
*Assistant Examiner*—Justin M Pats
(74) *Attorney, Agent, or Firm*—Holland & Knight LLP; Brian J Colandreo, Esq.; Seth A. Milman

(57) ABSTRACT

A system for integrating project events with personal calendar and scheduling clients, includes a first server including a place database having a member profiles database and an events database; a place server, and an email transport facility including an email application; a client including a calendar and scheduling program; the member profiles database being responsive to member input for storing member subscriptions to the calendar and scheduling program; the place server responsive to said email transport facility receiving a create, update, or delete event from a member of the place database for creating in the events database a project event; the place server responsive to a create, update, or delete event for determining from the member profiles database those members subscribing to each of a plurality of calendar and scheduling programs; said place server further for sending to each member subscribing to a calendar and scheduling program an email notification of the project event personalized to the calendar and scheduling program to which the member has subscribed.

20 Claims, 7 Drawing Sheets

OTHER PUBLICATIONS eRoom, eRoomHelp, Copyright 2001, eRoom Technology, Inc., Sections—Welcome to eRoom, Real time meetings, Working with your eRooms, Working with items, Notes, Polls, Calendars, Inboxes, Files, Controlling acess to information, Facility administration, Server administration, p. 1-60, http://sccmecomdmz.sccm.org/eRoomHelp/ index.htm.* eRoom and Microsoft Office 2000, Archive.org, http://web.archive.org/web/20031218182804/ http://sccmecomdmz.sccm.org/eRoomHelp/office.htm.*

David Buchmann, SyncML, Diploma Thesis in Informatics, University of Fribourg, Switzerland, p. 1-48, Sep. 2002.*

Griss et al., CoolAgent: Intelligent Digital Assistants for Mobile Professionals—Phase 1, Retrospective, p. 1-18, Jul. 9, 2002.*

*Calendaring and Group Scheduling with MDaemon 6.0*, Alt-N Technologies, Arlington, Texas, 2002, 22 pages.

\* cited by examiner

```
                                             ┌─ 712
┌────────────────────────────────────────────┴──────┐
│ CALENDAR INFORMATION                              │
│                                                   │
│ DATE                          03/02/2003   ▦      │
│                                                   │
│ START TIME                    [9▼] [00▼]  [AM▼]   │
│ DURATION                                          │
│                               [1 HOUR▼] [0 MIN▼]  │
│   ☐ ALL DAY EVENT                                 │
│   ☐ REPEATS            ┌─ 714                     │
│   ☑ SENT EVENT TO   ◢                             │
│     CALENDAR SUBSCRIBERS                          │
└───────────────────────────────────────────────────┘
```

FIG. 5

SYSTEM AND METHOD FOR INTEGRATING PROJECTS EVENTS WITH PERSONAL CALENDAR AND SCHEDULING CLIENTS

CROSS REFERENCES TO RELATED APPLICATIONS

U.S. patent applications
Ser. No. 10/334,269 filed Dec. 31, 2002 entitled "SYSTEM AND METHOD FOR THE AGGREGATION OF PLACE INFORMATION IN A MULTI-SERVER SYSTEM", now U.S. Pat No. 7,213,010, issued 1 May 2007;
Ser. No. 10/334,261, filed Dec. 31, 2002 entitled "SYSTEM AND METHOD FOR AGGREGATING USER PROJECT INFORMATION IN A MULTI-SERVER SYSTEM", now U.S. Pat No. 6,904,439, issued 7 Jun. 2005;
Ser. No. 10/334,296, filed Dec. 31, 2002, entitled "SYSTEM AND METHOD FOR CENTRAL REFRESH OF PLACE OBJECTS";
Ser. No. 10/334,268, filed Dec. 31, 2002, entitled "SYSTEM AND METHOD FOR SEARCHING A PLURALITY OF DATABASES DISTRIBUTED ACROSS A MULTI SERVER DOMAIN", now U.S. Pat No. 7,089,231, issued 8 Aug. 2006.
Ser. No. 09/752,120, filed 29 Dec. 2000, entitled "METHOD AND SYSTEM FOR CREATING A THEME OF A PLACE TO BE USED AS A TEMPLATE FOR OTHER PLACES", now U.S. Pat No. 7,028,262, issued 11 Apr 2006;
Ser. No. 10/349,412, filed 22 Jan. 2003, entitled "SYSTEM AND METHOD FOR HIERARCHICALLY INVOKING RE-ENTRANT METHODS ON XML OBJECTS";
Ser. No. 10/349,424 filed 22 Jan. 2003, entitled "SYSTEM AND METHOD FOR COMMAND LINE ADMINISTRATION OF PROJECT SPACES USING XML OBJECTS", now U.S. Pat No. 7,167,874, issued 23 Jan. 2007;
Ser. No. 10/349,356, filed 22 Jan. 2003, entitled "SYSTEM AND METHOD FOR INTEGRATING ONLINE MEETING MATERIALS IN A PLACE";

are assigned to the same assignee hereof and contain subject matter related, in certain respect, to the subject matter of the present application. The above identified patent applications are incorporated herein by reference.

BACKGROUND OF THE INVENTION

1. Technical Field of the Invention

This invention relates to calendar and scheduling. More particularly, it relates to integrating project events with personal calendar and scheduling clients.

2. Background Art

A problem in the art relating to calendar and scheduling (C&S) applications is the repetitive visitation of different place calendars required in order to keep track of calendar events throughout different projects or places.

The same problem has been identified by others, but their solution has been to develop procedures which require the user to download/upload and synchronize the events into/from their calendars. Examples: Yahoo calendaring (www.yahoo.com), Palm Pilot calendaring (www.mypalm.com). However, none of these have developed a seamless integration where the project events are received in the same manner as when a colleague invites a person to a meeting within the organization's information infrastructure (as is done with email and C&S applications such as Notes/Domino, Outlook/Exchange).

There is a need in the art for a different solution, one where once a user has subscribed to a Place calendar there is no need for the user to synchronize or download any calendar event information. The user automatically receives calendar invitations through email in the same manner as when receiving other meeting invitations.

It is known for projects, such as those managed by an IBM® Lotus® QuickPlace® server, to create e-mails about content. However, there is a need for a system and method for formatting such events in a project calendar as Notes 5 meetings, Notes 6 meetings, Outlook events, and any icalendar enabled client.

Icalendar is an open standard calendaring protocol. (See RFC 2445.) According to that protocol, the following fields are specified for sharing information among calendar & scheduling (C&S) programs:
STARTTIME:
ENDTIME:
DURATION:
LOCATION:
ATTENDEES
SUBJECT
CHAIR
LANGUAGE
. . .

Domino, IBM, the IBM Logo, Lotus, Notes, QuickPlace are trademarks of International Business Machines in the United States, other countries, or both. Microsoft and Microsoft Outlook are trademarks of Microsoft Corporation.

OBJECTS AND SUMMARY OF THE INVENTION

It is an object of the invention to provide an improved system and method for integrating project calendar events to a user calendar.

In accordance with a preferred embodiment of the invention, a method is provided for integrating project events with personal calendar and scheduling clients, by establishing a project calendar; establishing a personal calendar for a member of the project; receiving into a member profile indicia indicative of whether to send events published on the project calendar to the personal calendar; receiving into the member profile indicia indicative of a calendar and scheduling format used by the member for the personal calendar; and responsive to creation of an event in the project calendar, forwarding the event to the personal calendar of the member in that format.

A system for integrating project events with personal calendar and scheduling clients, includes a first server including a place database having a member profiles database and an events database; a place server, and an email transport facility including an email application; a client including a calendar and scheduling program; the member profiles database being responsive to member input for storing member subscriptions to the calendar and scheduling program; the place server responsive to said email transport facility receiving a create, update, or delete event from a member of the place database for creating in the events database a project event; the place server responsive to a create, update, or delete event for determining from the member profiles database those members subscribing to each of a plurality of calendar and scheduling programs; said place server further for sending to each member subscribing to a calendar and scheduling program an email notification of the project event personalized to the calendar and scheduling program to which the member has subscribed.

In accordance with an aspect of the invention, there is provided a computer program product configured to be operable to integrating project events with personal calendar and scheduling clients.

Other features and advantages of this invention will become apparent from the following detailed description of the presently preferred embodiment of the invention, taken in conjunction with the accompanying drawings.

BRIEF DESCRIPTION OF THE DRAWINGS

FIG. 5 is a diagrammatic view of a QuickPlace send to subscribers checkbox on a calendar field.

BEST MODE FOR CARRYING OUT THE INVENTION

In accordance with the preferred embodiments of the invention, a system and method is provided for displaying place calendar events in a user's primary calendar tool. By centralizing place calendar events in a user's primary calendar tool, the user is required to visit only one calendar to see all events of relevance.

In accordance with the preferred embodiments of the invention, members of a collaboration space, such as QuickPlace, receive calendar pages created in QuickPlace into their own calendaring and scheduling (C&S) calendar. This enables integration of, for example, Lotus Notes 5.x and 6.0, Microsoft Outlook 98® and above, and any icalendar standard enabled C&S client.

Figure 1:
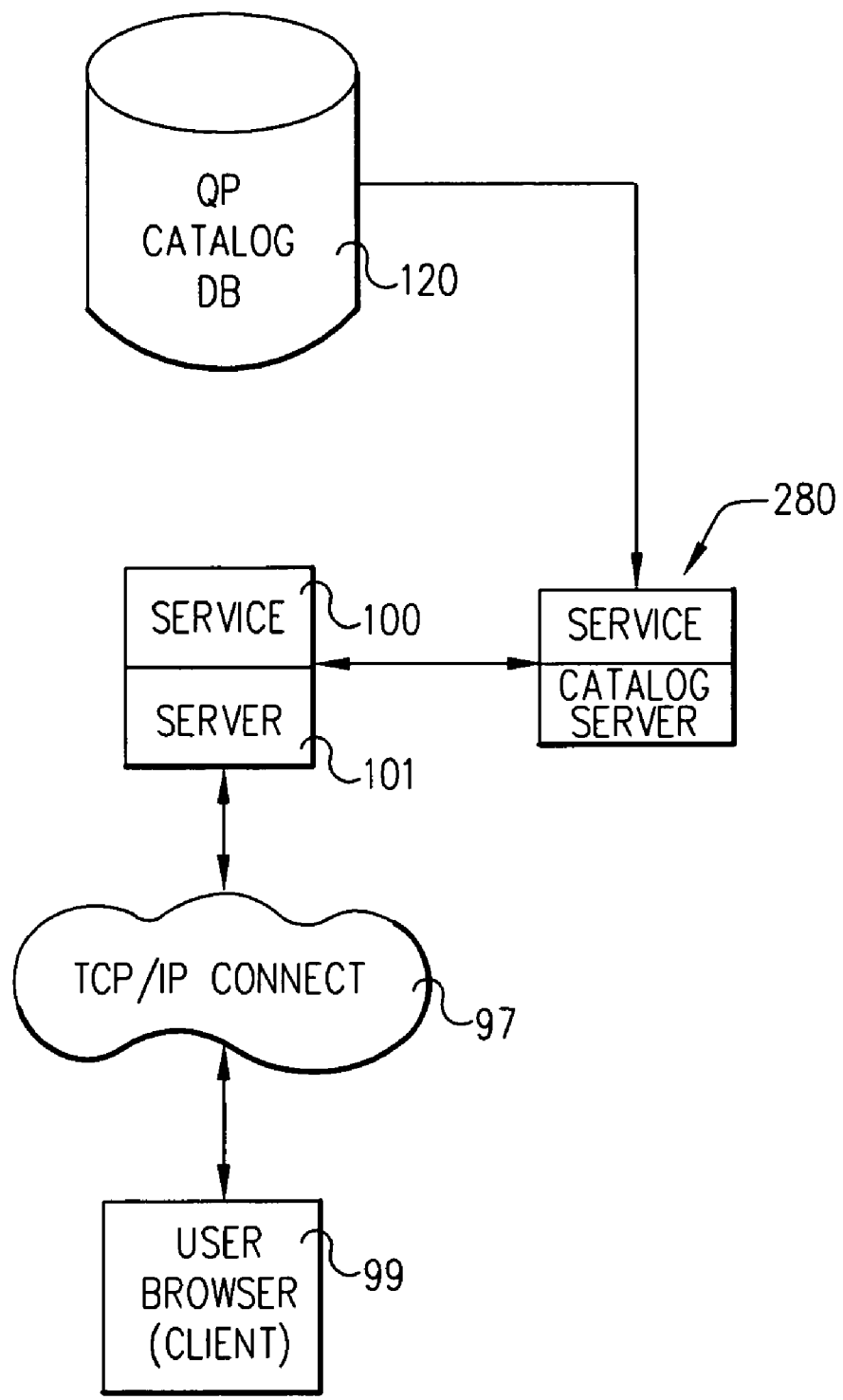
FIG. 1 is a high level system diagram illustrating a typical system configuration in accordance with the preferred embodiment of the invention.
Figure 2:
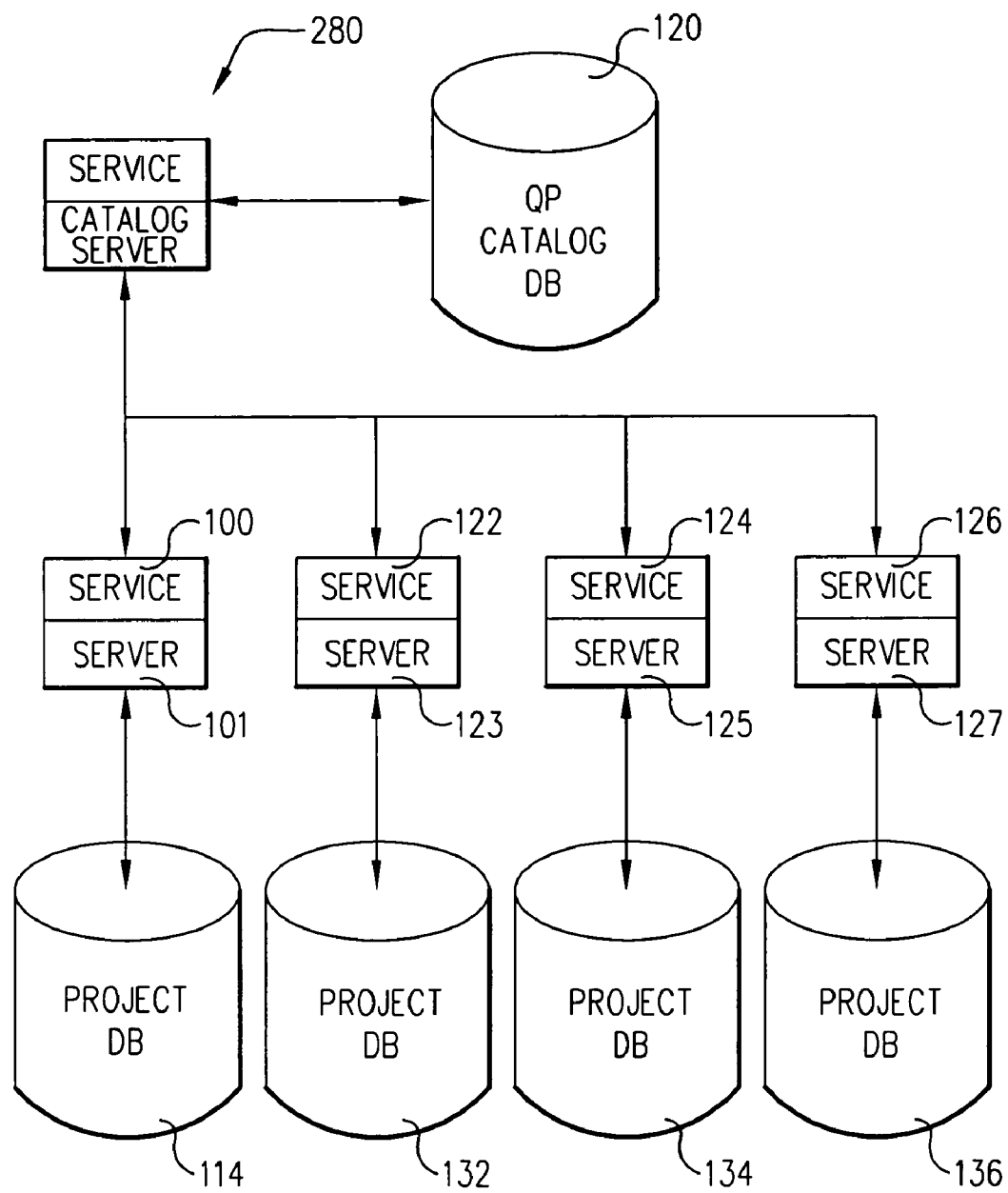
FIG. 2 is a high level system diagram illustrating a typical multi-server system environment.

Referring to FIGS. 1 and 2, a system environment of interest includes QuickPlaces 114, 132, 134, 136, in a multi-server system environment, including service 100/server 101, 122/123, 124/125, and 126/127, communications link 97, one or more client terminals, such as user browsers 99, and a database including, for example, a catalog 120, such as a QuickPlace catalog, for aggregating information about projects.

Throughout this specification, the generic term "project" and more specific terms "place" or "QuickPlace" are used substantially interchangeably. Place and QuickPlace are specific examples of projects. Similarly, "host catalog" and "QuickPlace catalog" are substantially equivalent terms.

The functionality available to each user via remote terminals 99 may be customized in accordance with the needs and authorization of the user and/or entity. Terminals 99 may access the system using, for example, browser software technology or other electronic accessing methods known to one of skill in the art. Reports and other information displayed to the end user at terminal 99 may be displayed using known web page formatting techniques.

Communication link 97 links remote terminals 99 to server 101. Link 97 may be a hardwired link, such as a telephone line, coaxial cable, digital data line, or the like, or a wireless link such as a radio frequency or infrared communications link, or the like.

As illustrated in FIG. 1, a QuickPlace service 100 represents a group a servers that are able to communicate with each other through a network, and work together to provide function (such as project creation, search across projects and servers, and get aggregate views across all servers and projects).

Referring to FIG. 2, this service may be implemented in an abstract sense, in that each server 101, 123, 125, 127 implements a notion of service 100, 122, 124, 126, respectively, which in this sense is a multi-server deployment of QuickPlace servers that can be treated as a consistent unit of service for administration and in the user interface.

A QuickPlace service 100 comprises multiple QuickPlace servers 101 and/or QuickPlace clusters, which: (1) are in the same IBM® Lotus® Domino™ domain; (2) share the same user directory and authentication system; (3) are on the same user network (i.e., are not separated by a firewall); and (4) are administered by the same administration team. These constraints are enough to ensure across the service that: (1) servers 101 can be configured consistently; (2) servers 101 can communicate and share data with each other; (3) user identities are in the same name space and do not collide; and (4) single sign on authentication can be implemented.

Figure 3:
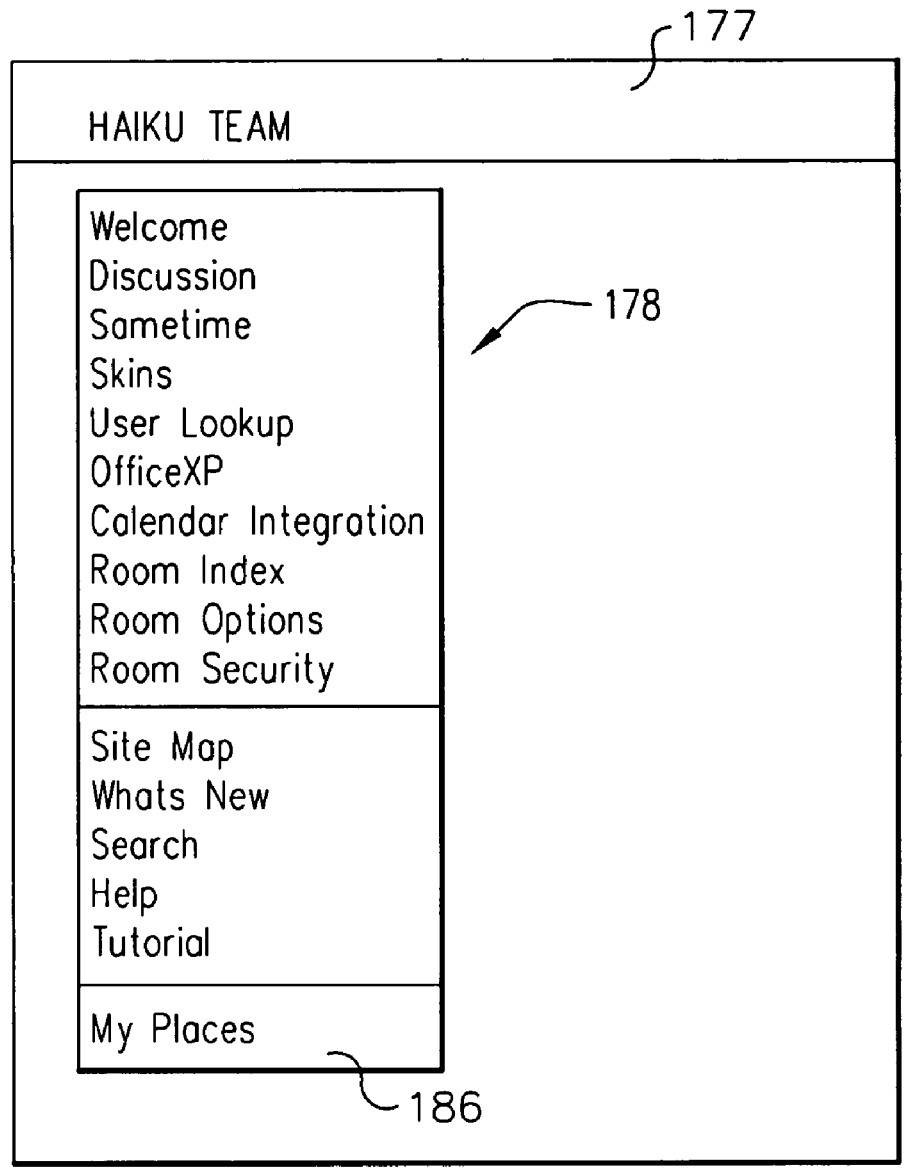
FIG. 3 is a diagrammatic view of a Place page with a table of contents entry for "Calendar Integration".

Referring to FIG. 3, a place display window 177 includes a table of contents (TOC) sidebar 178 in which appears a My Places button 186 and a TOC selection entry for calendar integration, selection of which enables the user to select calendar options or preferences relating to the calendar.

A QuickPlace calendar event is any page in QuickPlace that contains the QuickPlace calendar control.

Figure 4:
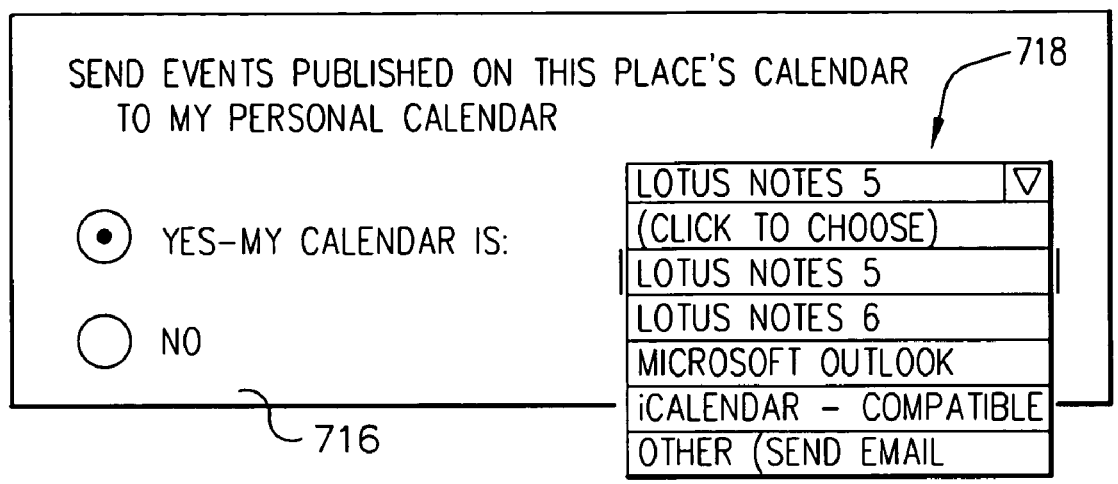
FIG. 4 is a diagrammatic view of a QuickPlace member information page with an option for subscribing to calendar messages and specifying type of calendar.

Referring to FIG. 4, users select whether to send events published on this place's calendar to their personal calendar, and specify what calendar and scheduling (C&S) program they use from drop down list 718 when they are editing their member profile information 716. This list 718 can contain any of several C&S formats, including Notes 5, Notes 6, MS Outlook, icalendar, plain-text. Which formats are shown in the above list 718 is controlled through a setting in the XML configuration file for the QuickPlace server 101 (qpconfig.xml).

Referring to FIG. 5, a calendar information field 712 includes a send event to calendar subscribers checkbox 714 for use by a user when scheduling a QuickPlace event.

Figure 6:
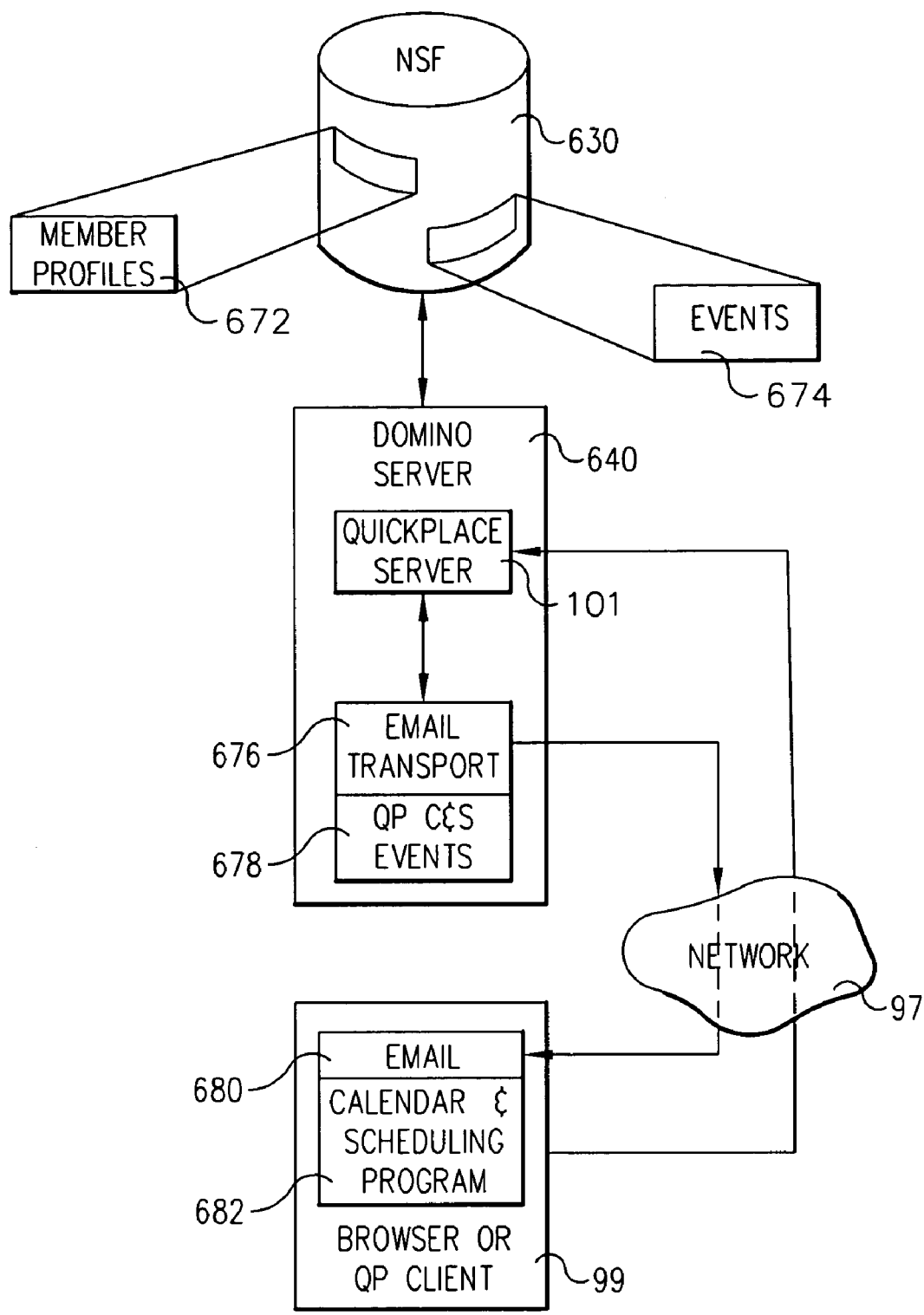
FIG. 6 is a high level system diagram illustrating the preferred embodiment of the invention for integrating project events with personal calendar and scheduling clients.

Referring to FIG. 6, a preferred embodiment of the client/server system of the invention includes on the system side a Domino Server 640 and a place database 630, which includes a member profiles database 672 and an events database 674. Server 640 includes a QuickPlace server 101 and an email transport facility 676 which includes a QuickPlace calendar and scheduling events store. On the client side, browser or QuickPlace client 99 includes an email application and a calendar and scheduling program.

In operation, a user at client 99 can specify that an event that is saved in this QuickPlace 101, for example, is to be sent to users who have set their member profile to receive calendar events from this QuickPlace 101 in their calendar and scheduling client.

User actions which will cause other users to receive an event notification are create, update, and delete events at the server 640. The event 674 to be calendared is created in the place itself. The user of the place subscribes in profile 672 to the calendar, and specifies the type of calendar he uses. The event 678 sent from server 101 by email transport 676 can then be personalized to the user selected C&S application 682 as an attachment to email 680, such as in Notes format or icalendar format.

When an event 678 is created in server 640, it checks the member profile 672 to see who has subscribed to receive calendar event 674. For each member who has subscribed, it checks for calendar program type, and then generates the appropriate format e-mail for distribution to each set of users (a set each for those who have requested Notes 5, Notes 6 or icalendar format).

Figure 7:
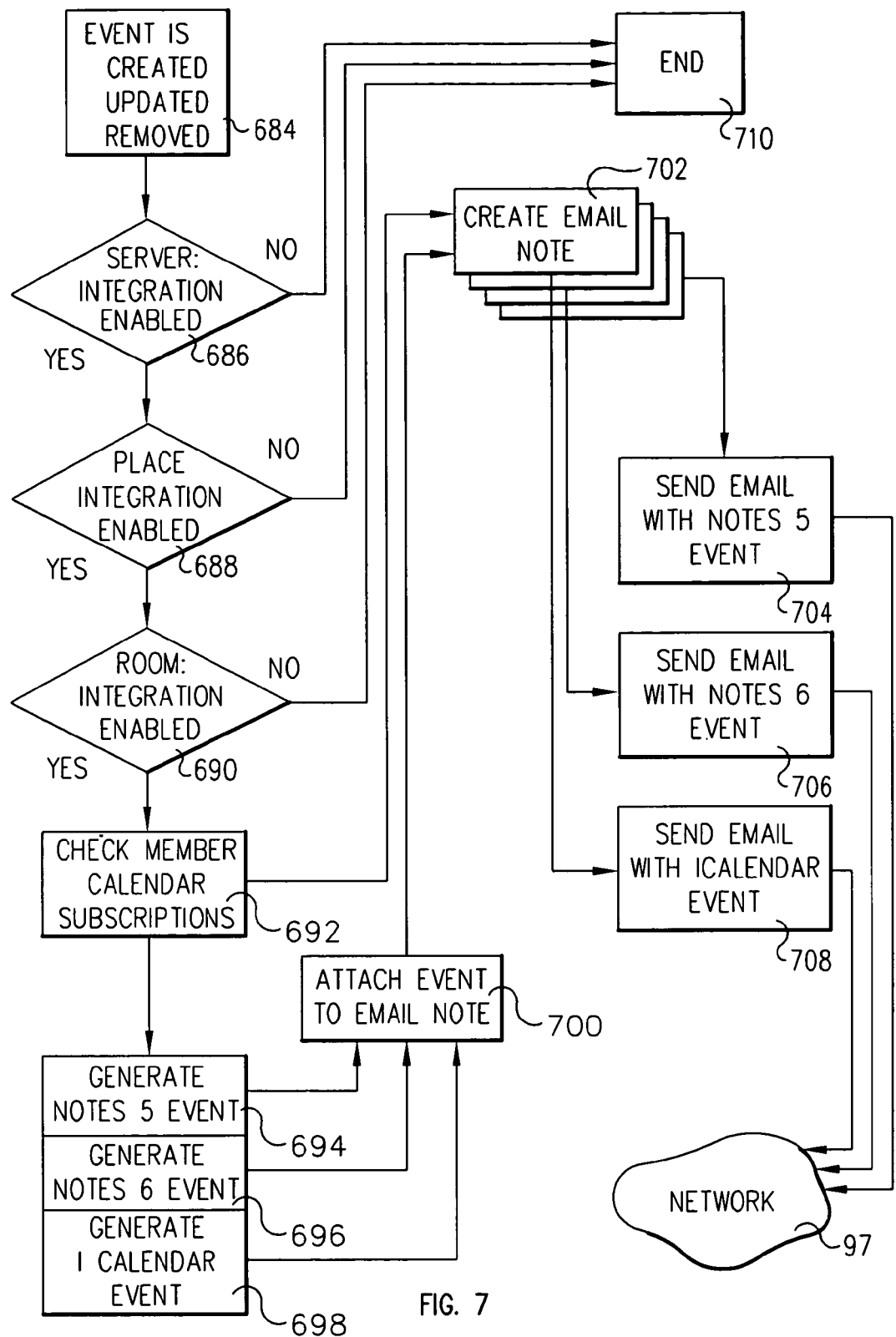
FIG. 7 is a flow chart illustrating an exemplary embodiment of the method of the invention for integrating project events with personal calendar and scheduling clients.

Referring to FIG. 7, in accordance with an exemplary embodiment of the invention, in step 684 an event 678 is created, updated, or moved. Server 101 responds by checking in step 686 if calendar integration is enabled at the server level, in step 688 if it is enabled at the place level, and in step 690 if it is enabled at the room level. If not, at any of these levels, calendar integration ends in step 710. If enabled at all these levels, server 101 in step 692 checks member profiles 672 for calendar subscriptions and in step 694 generates for those members subscribing to Notes 5 an attachment in Notes 5 format, in step 696 generates for those members subscribing to Notes 6 at attachment in Notes 6 format, and in step 698 generates for those members subscribing to icalendar events an attachment in icalendar format. In step 700 these attachments are attached to email notes 702 which in steps 704, 706 and 708 are sent via network 97 to respective Notes 5, Notes 6, and iCalendar users.

Thus, there are three levels of calendar integration: whole server, place by place, and room by room. These are all saved in the .nsf files.

QuickPlace (QP) members control whether or not to receive calendar events by subscribing to the calendar events in the same manner as they subscribe to receive "what's new" mail. Thus, the QP member controls whether to receive events or not.

QuickPlace managers can enable or disable various degrees of granularity, as follows:

1. Enable or disable calendar integration entirely in a QuickPlace server via an administration scene of the QP server 101, or
2. Enable or disable calendar integration entirely for a specific QuickPlace(s) via a QuickPlace change-basics option, or
3. Enable or disable calendar integration for a specific room's calendar, via the calendar folder options.

In addition, a room manager can control whether pages that contain the calendar control (a.k.a. calendar pages) in a room are always sent to the members who have subscribed, or the author of the page chooses whether or not the page is sent to subscribers, or the calendar pages in the room are never sent as calendar events to the subscribers.

A QuickPlace notify feature sends a text email containing information about the page's location, description, and so forth. The send calendar event option sends a calendar event formatted email 704-708 which is integrated at the browser with C&S calendar 682.

QuickPlace calendar events 678 are integrated with the C&S client 682 once the event reaches client 99 in the following ways.

1. To Lotus Notes subscribers, the email 704 or 706 contains the calendar event 678 information encoded into Lotus Notes document fields carried in SMTP x-header fields. These fields are interpreted by the Lotus Notes C&S client 682 template and processed according to the template rules, thereby becoming a Notes Meeting invitation.
2. To Microsoft Outlook subscribers, the email 708 contains an icalendar-standard attachment file that contains the calendar information for the event 678 in the QuickPlace. This icalendar attachment is imported into the user's calendar by C&S program 682. For Microsoft Outlook the attachment 698 in email 708 can be dragged-and-dropped into the Outlook calendar or opened and accepted by double clicking the attachment.
3. To users of other icalendar-standard C&S clients, the email is the same as for Microsoft Outlook. The email contains an icalendar file attachment which can be imported into the C&S calendar as dictated by the client.

Calendar integration supports one-way workflow. This means that in order to propagate changes (time, or date, or cancel) done to an event 674 that was originally created in QuickPlace, the event can only be updated or canceled through the QuickPlace 101 itself. In other words, the time of the event in a C&S calendar client 99 cannot be changed and expect the QuickPlace event 674 to be updated from the client.

A member of a place subscribes to the calendar(s) of a place through a member profile 672.

For events 678 formatted for Lotus Notes Calendar clients, QuickPlace 101 creates an email note 702 and adds the fields set forth in Table 1 to the note in order for the Lotus Notes Calendar client C&S program 682 to process the email as a calendar event:

TABLE 1

EMAIL FIELDS FOR LOTUS NOTES C&S CLIENTS

| Item Name | Date Type | Event Type | Purpose |
|---|---|---|---|
| Tracking related note items: | | | |
| $C$Track | text | N/U/C | revision tracking |
| $C$Version | text | N/U/C | Notes client use |
| $C$Flags | text | U/C | Notes client use |
| ApptUNID | text | N/U/C | event UNID in Place |
| SequenceNum | text | N/U/C | number of event changes |
| $RefOptions | text | U/C | Notes client use |
| $Ref | RefList | U/C | Event NID in client |
| Content related note items: | | | |
| AppointmentType | text | N/U/C | event type |
| NoticeType | text | N/U/C | notice action |
| Form | text | N/U/C | form to use in client |
| Topic | text | N/U/C | event topic |
| Subject | text | N/U/C | email subject |
| _ViewIcon | number | N/U/C | icon to display in client |
| Logo | text | N | logo to display in client |
| Timestamp and date related not items: | | | |
| StartDateTime | text | N/U/C | start timestamp |
| StartDate | text | N/U/C | start timestamp |
| StartTime | text | N | start timestamp |
| EndDateTime | text | N/U/C | end timestamp |
| EndDate | text | N | end timestamp |
| EndTime | text | N | end timestamp |
| WebDateTimeInit | text | N | for client use |
| WebCategory | text | N | for client use |
| $WebFlags | text | N | for client use |

TABLE 1-continued

EMAIL FIELDS FOR LOTUS NOTES C&S CLIENTS

| Item Name | Date Type | Event Type | Purpose |
|---|---|---|---|
| People related note items: | | | |
| Chair | text | N/U/C | chair |
| AltChair | text | N/U/C | alternate chair |
| $LangChair | text | N/U/C | chair language |
| $NameLanguageTags | text | N | name tags language |
| Principal | text | N/U/C | principal |
| $AltPrincipal | text | N/U/C | alternate principal |
| $LangPrincipal | text | N/U/C | principal language |
| RequiredAttendees | textlist | N/U/C | |
| AltRequiredNames | textlist | N/U/C | |
| INetRequiredNames | textlist | N/U/C | |
| StorageRequiredNames | text | N/U/C | for client use |
| $ExpandGroups | text | N/U/C | for client use |
| Mail related note items: | | | |
| MailFirstPass | text | N/U/C | for client use |
| MailOptions | text | N | for client use |
| OrgConfidential | text | N | for client use |
| $PublicAccess | text | N/U/C | for client use |
| $SMTPKeepNotesItem | text | N/U/C | SMTP x-header fields |
| Template related note items: | | | |
| tmpNoActionBar | text | N | notes template use |
| tmpOEMClient | text | N | notes template use |
| tmpOwnerHW | text | N | notes template use |

Legend:
N/U/C = item present in type of notice.
N = new
U = updated (rescheduled)
C = cancellation Table 2 sets forth items created and populated by the Notes client mail process when creating a regular mail note or a calendar note. These items are inspected at server 101 by trapping the note at the mail.box by quitting the nrouter server process (not shown). This is needed when the mail process 676 is not designed to send, for example, Lotus Notes specific mail notes to Lotus Notes mail clients, but rather is designed to send regular email without knowledge that a mail client will receive the mail note at the other end.

TABLE 2

ITEMS CREATED AND POPULATED BY CLIENT

| Item Name | Date Type | Event Type | Purpose |
|---|---|---|---|
| Principal | text | N/U/C | CN of the principal |
| $AltPrincipal | text | N/U/C | |
| $LangPrincipal | text | N/U/C | |
| $Mailer | text | N | Lotus Notes Build |
| $StorageTo | text | N | |
| Encrypt | text | N/U/C | |
| INetCopyTo | text | N | |
| INetBlindCopyTo | text | N | |
| INetSendTo | text | N | |
| Logo | text | N | |
| Sign | text | N | |

Legend:
N/U/C = item present in type of notice.
N = new
U = updated (rescheduled)
C = cancellation Table 3 sets forth items created and populated by the QP 101 mail process for email notes. These items do not need to be populated by the server 101 mail process for calendar event notes (except where noted by *).

TABLE 3

ITEMS CREATED AND POPULATED BY QP MAIL PROCESS

| Item Name | Date Type | Event Type | Purpose |
|---|---|---|---|
| $MessageID | text | N/U/C | |
| $UpdatedBy | list | N/U/C | |
| BlindCopyTo | text | N | |
| CopyTo | text | N | |
| Body | composit | N/U/C | |
| *Form | text | N/U/C | Reset to "Notice" |
| From | text | N/U/C | |
| PostedDate | timedate | N/U/C | |
| Recipients | text | N/U/C | |
| *Subject | text | N/U/C | N = invitation<br>U = reschedule]<br>C = cancelled |

Legend:
N/U/C = item present in type of notice.
N = new
U = updated (rescheduled)
C = cancellation Calendar integration enables QuickPlace members to use their Outlook or Notes calendaring client to track calendar events that are published to QuickPlace. Users are able to choose to automatically receive notifications for all calendar events published to a given QuickPlace, with updates as needed. Authors are also able to manually send a calendar notification for a specified event to any QuickPlace members. Various configuration options are provided to enable server administrators, room managers, and QuickPlace members to control whether and how notifications are sent.

In accordance with an exemplary embodiment of the invention, users using the calendar integration features, are able to:

1) Receive calendar notifications using the following mail clients: Lotus Notes/Domino R5 and above; Microsoft Outlook 98 and above. A "calendar event" is defined as any form that is shown on the room calendar. This includes built-in calendar event forms, simple forms that use the calendar control, and HTML forms that include the fields necessary to be shown on the room calendar. The calendar notification includes the subject, calendar information (time, duration, repeats, etc.), description, other custom fields on the page, and the URL of the corresponding page in the QuickPlace. (For example, with scheduled Sametime meetings, the custom field that renders the URL of the Sametime meeting is included in the message.)

2) Set an option in each QuickPlace to receive calendar notifications any time a new page is published to any calendar in the QuickPlace, or deleted from any calendar in the QuickPlace.

3) Have author control over sending event notifications when editing a calendar page (since some edits will not merit sending an update to subscribers).

4) Request a batch of notifications corresponding to the currently published future events shown on any selected individual calendar in the QuickPlace, in order to update the user's calendar when joining a QuickPlace in mid-flow.

5) Send an individual calendar notification via the Notify action (or Publish As->Notify) for a page shown on any calendar in the QuickPlace. For members who have a stated calendar type, the notification is formatted accordingly, otherwise the regular ASCII notification is be sent.

Other facilities provided include:

1) Managers are able to disable all automatic calendar notifications in a given room. E.g., in each calendar's "Folder Options" settings.

2) The membership management API provides a parameter for setting the user's calendar notification preferences.

3) The server administrator has an option to disable all automatic calendar notifications on the server. (E.g., to support clustering.) A Domino cluster is a group of two to six servers that provide users with constant access to data, balances the workload between servers, improves server performance, and maintains performance when the size of an enterprise increases. The servers in a cluster contain replicas of databases that are to be readily available to users at all times. If a user tries to access a database on a cluster server that is unavailable, Domino opens a replica of that database on a different cluster server, if a replica is available. Domino continuously synchronizes databases so that whichever replica a user opens, the information is always identical. Clusters provide high availability of important databases, and clustered servers can redirect database open requests to other servers in the clusters, allowing users uninterrupted access to their databases. Clustering is used to provide high availability of a QuickPlace service 100, 122, 124, 126, or group of servers 101, 123, 125, 127. Servers in a cluster are administered by adding, removing, or upgrading them.

4) An option may be provided on custom forms to disable automatic calendar notifications for pages based on the form.

5) An option may be provided for the server administrator to set the default calendar type preference for users on a given QuickPlace server 101. For example, on an intranet server for a company that uses Notes R5 for mail and calendaring, the administrator may all users to automatically set their calendar type to Notes R5.

Options on member information page 716 to subscribe to calendar messages and specify type of calendar may include the following:

1) Calendar integration is presented as a subscription service.

2) Individual members can subscribe to receive events that are published in the place on their personal calendars by setting a preference on the Member Information page.

3) Not available to group members since no preference mechanism is supported for these users.

4) The user is required to specify his/her calendar type 718, in order to assure successful formatting of events for the calendar.

For Send to Subscribers checkbox 714 on the calendar field 712:

1) When an author creates or edits a calendar page (any page that includes the QuickPlace calendar field group), a checkbox is presented that enables the author to determine whether or not publishing the page should cause the event to be sent to subscribers' calendars. For new pages, the checkbox is checked by default.

2) The subscription mechanism respects access controls. Only those people who have access to a calendar event will be sent the event.

When modifying an existing calendar event, updates are sent if the checkbox 714 is checked. The behavior of the checkbox 714 is:

Unchecked by default

If author changes the date/time settings, checkbox becomes checked

Author can check/uncheck any time before publishing

A JavaScript alert may be presented to the user when deleting a calendar event to confirm sending a cancellation notice before it is sent.

Because users may join a place, or change their subscription options, after the calendar has been populated, a synchronization of existing events is provided, as follows:

1) A "Send To My Calendar" action may be displayed on individual pages. This enables users to cherry-pick events to add to his/her personal calendar. When clicked, a confirmation animation is displayed, then the same page reloads.

2) A "Synchronize With My Calendar" action may be displayed on each calendar in a place. This presents a scene that enables users to specify the number of days/weeks to receive event updates for.

Calendar subscriptions work independently of any existing author-initiated Notify feature that can be triggered from a Notify skin component or through Publish As-Notify. If an author wishes, he/she can send a notification to all or a subset of members, as well as triggering the calendar subscriptions. Notifications sent to calendar pages are simple email messages containing a text message and a link to the page, as has been done in the prior art.

To support security, the calendar integration facility of the present invention recognizes access levels, as follows:

1) The calendar integration feature is available to readers, authors and managers who are individual members of a place. Events are only sent to users who have reader or higher access to the event page in the place. "Having access" does not include the case where the user technically is in the room and page ACL, but cannot enter the room because the user is not in a parent room's ACL.

2) The calendar integration feature is not available to anonymous users, or members of external groups, nor enabled for Superusers.

Calendar integration can be customized to different scopes, as follows:

1) Each calendar in a place can be customized to enable/disable automatic notifications for events posted to that calendar. This enables managers/PlaceType designers to limit subscriptions to high-value calendars. For example, an out-of-office calendar might be disabled, whereas an online meeting calendar might be enabled.

2) Custom forms can be customized to enable/disable subscriptions. On a form in which subscriptions are disabled, the subscriber checkbox 714 is hidden in the calendar field group 712.

3) An option may be provided in Basics to enable/disable notifications in the place. If subscriptions are disabled, the entire subscription UI is be hidden in the place.

4) An option may be provided in Server Settings to enable/disable calendar subscriptions. If subscriptions are disabled, the entire subscription UI is hidden in all places on the server.

5) The calendar folder options propagate from a PlaceType to its children.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, PI/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for integrating project events on a team collaboration server with personal calendar and scheduling clients, comprising:
    establishing for a project a collaboration space, on the team collaboration server, including a plurality of rooms in a hierarchy of rooms and within each of said plurality of rooms a plurality of sub-rooms with single sign on authentication to places within said hierarchy of rooms;
    establishing a project calendar in each of said plurality of said rooms in said hierarchy of rooms;
    establishing a personal calendar on one or more of said scheduling clients for a member of said project, said member designated by access control membership within a given sub-room in said hierarchy of rooms;
    receiving into a member profile indicia indicative of whether to send events published on said project calendar for said given sub-room in said hierarchy of rooms to said personal calendar;
    providing at least three calendar and scheduling formats, each of the calendar and scheduling formats specific to at least one calendar and scheduling client application, each calendar and scheduling format comprising particular and distinct operations and instructions;
    receiving into said member profile indicia indicative of a selected calendar and scheduling format of the at least three calendar and scheduling formats used by said member for said personal calendar; and
    responsive to creation of a created event in said project calendar for said given sub-room for said member having membership in said given sub-room, forwarding said created event from the team collaboration server to said personal calendar of said member in said selected calendar and scheduling format;
    performing the above operations for a plurality of members of said project;
    thereby automatically integrating and coordinating a project event between the personal calendars of the plurality of members of said project, wherein said personal calendars of said plurality of members include at least a first calendar and scheduling format and at least a second calendar and scheduling format distinct from the first calendar and scheduling format.

2. The method of claim 1, further comprising:
    operating the team collaboration server for establishing and maintaining said project calendar; and
    displaying to each member of said plurality of members a list of calendar and scheduling program formats for selection of said indicia, said list being controlled through a setting in a configuration file for said place server.

3. The method of claim 2, said configuration file being an XML configuration file.

4. The method of claim 1, further comprising:
    receiving, by the team collaboration server, from a user scheduling a project event, indicia indicative of whether to forward said project event to members subscribing to calendar and scheduling applications, said project event being forwarded only to members having access control membership in said given sub-room.

5. The method of claim 4, further comprising:
    forwarding, by the team collaboration server, said project event to users who have set their member profile to receive in their calendar and scheduling client calendar events from said project.

6. The method of claim 1, further comprising:
    further responsive to creation of said event in said project calendar, for each of said plurality of members, determining from said member profiles those members subscribing to receive calendar events;
    for each of said subscribing members, determining from said member profile said selected calendar and scheduling format; and
    for each said format, generating and distributing email notifications in said selected calendar and scheduling format to each of said subscribing members subscribing to said calendar and scheduling format.

7. The method of claim 1, further comprising:
    managing a calendar integration at whole server, place by place, and room by room levels by forwarding said project event for a room within a place within a server only when said calendar integration is enabled with respect to said server, said place, and said room.

8. The method of claim 1, further comprising:
    synchronizing said project events to said personal calendar of said plurality of members joining a place or changing its subscription options.

9. A method for integrating project events on a team collaboration server with personal calendar and scheduling clients, comprising:
    establishing for a project a plurality of calendars, with a calendar established for the team collaboration server, for a plurality of projects within said team collaboration server, and for a plurality of rooms and sub-rooms organized as a hierarchy of rooms within each said project, and with each of said rooms and sub-rooms having defined membership;
    a user of a place selectively subscribing to one or more of said plurality of calendars at said server, project, and room levels in which said user has access control membership;
    selectively creating, updating, or moving a project calendar event;
    determining if a calendar integration is enabled at a server level, at a place level, and at a room level;
    providing at least three calendar and scheduling formats, each of the calendar and scheduling formats specific to at least one calendar and scheduling client application, each calendar and scheduling format comprising particular and distinct operations and instructions;
    responsive to said calendar integration not being enabled at said server, place and room levels, terminating said calendar integration with respect to said project calendar event; otherwise
    determining from member calendar subscriptions those subscribing members subscribing to a selected calendar and scheduling format of the at least three calendar and scheduling formats;
    preparing for each said selected calendar and scheduling format to which at least one of said subscribing members has subscribed an attachment in said selected calendar and scheduling format describing said project calendar event; and sending to each said subscribing member an email notification of said project calendar event including said attachment in said selected calendar and scheduling format to which said subscribing member has subscribed;

thereby automatically integrating and coordinating a project calendar event between the personal calendars of said subscribing members; wherein said personal calendars of said subscribing members include at least a first calendar and scheduling format and at least a second calendar and scheduling format distinct from the first calendar and scheduling format.

10. The method of claim 9, further comprising:

selectively enabling and disabling said calendar integration at said sever level by way of an administration scene of said server;

selectively enabling and disabling said calendar integration at said place level by way of a place change-basics option; and selectively enabling and disabling said calendar integration for a calendar of a specific room by way of a calendar folder option.

11. A system for integrating project events with personal calendar and scheduling clients, comprising:

a first server including a place database having a member profiles database and an events database; a place server, and an email transport facility including an email application;

said place database including a collaboration space database including a plurality of room databases organized in a hierarchy of parent/child rooms;

a client including a calendar and scheduling program;

providing for each said room within said hierarchy of parent/child rooms a separate calendar for a given room accessible only to members of said project-having access control membership in said given room;

said member profiles database being responsive to member input for storing member subscriptions to said calendar and scheduling program;

said place server providing at least three calendar and scheduling formats, each of the calendar and scheduling formats specific to at least one calendar and scheduling client application, each calendar and scheduling format comprising particular and distinct operations and instructions;

said member profiles including and indicia indicative of a selected calendar and scheduling format of the at least three calendar and scheduling formats;

said place server responsive to said email transport facility receiving a create, update, or delete event from a member of said place database for creating in said events database for said place database a project event;

said place server responsive to said create, update, or delete event on a calendar for a given room for determining for members having access control membership in said given room from said member profiles database those members subscribing to each of a plurality of said calendar and scheduling programs; and said place server further for sending to each member of a plurality of members having access control membership in said given room and subscribing to a calendar and scheduling program an email notification of said project event personalized to said calendar and scheduling program to which said member has subscribed, wherein the email includes said events in said selected calendar and scheduling format;

the system thereby automatically integrating and coordinating a project calendar event between the personal calendars of the said plurality of members, wherein said personal calendars of said plurality of members include at least a first calendar and scheduling format and at least a second calendar and scheduling format distinct from the first calendar and scheduling format.

12. A program storage device readable by a machine, tangibly embodying a program of instructions executable by a machine to perform method steps for integrating project events with personal calendar and scheduling clients, said method comprising:

establishing for said project a collaboration space including a plurality of rooms in a hierarchy of rooms and within each of a plurality of said rooms a plurality of sub-rooms with sign on authentication to places within said hierarchy of rooms;

establishing a project calendar in each of said plurality of said rooms in said hierarchy of rooms;

establishing a personal calendar for a member of said project, said member designated by access control membership within a given sub-room in said hierarchy of rooms;

receiving into a member profile indicia indicative of whether to send events published on said project calendar for said given sub-room in said hierarchy of rooms to said personal calendar;

providing at least three calendar and scheduling formats, each of the calendar and scheduling formats specific to at least one calendar and scheduling client application, each calendar and scheduling format comprising particular and distinct operations and instructions;

receiving into said member profile indicia indicative of a selected calendar and scheduling format of the at least three calendar and scheduling formats used by said member for said personal calendar; and responsive to creation of an event in said project calendar for said given sub-room for said member having access control membership in said given sub-room, forwarding said event to said personal calendar of said member in said selected calendar and scheduling format;

performing the above operations for a plurality of members of said project;

thereby automatically integrating and coordinating a project event over and between the personal calendars of the plurality of members of said project, wherein said personal calendars of said plurality of members include at least a first calendar and scheduling format and at least a second calendar and scheduling format distinct from the first calendar and scheduling format.

13. The program storage device of claim 12, said method further comprising:

operating a place server for establishing and maintaining said project calendar; and displaying to each member of said plurality of members a list of calendar and scheduling program formats for selection of said indicia, said list being controlled through a setting in a configuration file for said place server.

14. The program storage device of claim 13, said configuration file being an XML configuration file.

15. The program storage device of claim 12, said method further comprising:

receiving from a user scheduling a project event indicia indicative of whether to forward said project event to members subscribing to said calendar and scheduling client applications.

16. The program storage device of claim 15, said method further comprising:

forwarding said project event to users who have set their member profile to receive in their calendar and scheduling client calendar events from said project.

17. The program storage device of claim 12, said method further comprising:

further responsive to creation of said event in said project calendar, for each member of said plurality of members, determining from said member profiles subscribing members subscribing to receive calendar events;

for each said subscribing member, determining from said member profile said calendar and scheduling format; and for each said calendar and scheduling format, generating and distributing email notifications in said selected calendar and scheduling format to members subscribing to said selected calendar and scheduling format.

18. The program storage device of claim 12, said method further comprising:

managing a calendar integration at whole server, place by place, and room by room levels by forwarding said project event for a room within a place within a server only when calendar integration is enabled with respect to said server, said place, and said room.

19. The program storage device of claim 12, said method further comprising:

synchronizing project events to personal calendars of members joining a place or changing their subscription options.

20. A program storage device readable by a machine, tangibly embodying a program of instructions executable by a machine to perform method steps for integrating project events with personal calendar and scheduling clients, said method comprising:

establishing for a project a collaboration space including a plurality of rooms in a hierarchy of rooms and within each of a plurality of said rooms a plurality of sub-rooms;

establishing a project calendar in each of said plurality of said rooms in said hierarchy of rooms;

establishing a collaboration calendar for the collaboration space that includes the project calendar in each of said plurality of said rooms in said hierarchy of rooms;

establishing a personal calendar for a member of said project, said member having access control membership within a given sub-room in said hierarchy of rooms;

receiving into a member profile indicia indicative of whether to send said project events published on said project calendar for said given sub-room in said hierarchy of rooms to said personal calendar;

receiving into said member profile indicia indicative of whether to send said project events published on a calendar server computer;

providing at least three calendar and scheduling formats, each of the calendar and scheduling formats specific to at least one calendar and scheduling client application;

receiving into said member profile indicia indicative of a selected calendar and scheduling format of the at least three calendar and scheduling formats used by said member for said personal calendar;

receiving into said member profile indicia indicative of an email messaging format used by said member, wherein the email messaging format is specific to at least one email client application;

receiving into said member profile indicia indicative of whether to send a new calendar notification upon publication of a new page of said collaboration calendar, a new page of said project calendar, and a new page of said plurality of rooms;

responsive to creation, updating, and moving of said project events in said project calendar for said given sub-room for a member having access control membership in said given sub-room, forwarding as an attachment to an email having said email messaging format said project events to said personal calendar of said member in said calendar and scheduling format based on said at least one calendar subscription; and synchronizing said personal calendar of said member with said project calendar and one or more of:

a server level project calendar;

one or more of said project calendars associated with one or more of said plurality of rooms;

one or more of said calendars associated with one or more of said plurality of sub-rooms wherein the at least three calendar and scheduling formats are at least:

a format for a Lotus Notes application;

a format for a Microsoft Outlook application; and a format for an icalendar standard application.

\* \* \* \* \*

UNITED STATES PATENT AND TRADEMARK OFFICE
CERTIFICATE OF CORRECTION

| | | |
|---|---|---|
| PATENT NO. | : 7,584,114 B2 | Page 1 of 1 |
| APPLICATION NO. | : 10/349427 | |
| DATED | : September 1, 2009 | |
| INVENTOR(S) | : Estrada et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1522 days.

Signed and Sealed this

Fourteenth Day of September, 2010

David J. Kappos
*Director of the United States Patent and Trademark Office*